3,658,801
TRISUBSTITUTED ISOCYANURATES

David A. Berry, Columbus, and Gilbert M. Gynn, Hilliard, Ohio, assignors to Dart Industries, Inc., Los Angeles, Calif.
No Drawing. Filed June 10, 1969, Ser. No. 832,015
Int. Cl. C07d 55/38
U.S. Cl. 260—248 NS
2 Claims

ABSTRACT OF THE DISCLOSURE

A scratch resistant thermosetting resin having excellent surface hardness is derived from a trisubstituted isocyanurate composition represented by the formula:

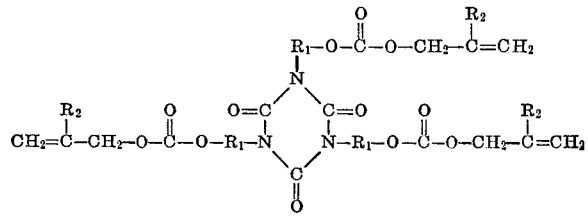

wherein $R_1$ is a lower alkyl and $R_2$ is H or an alkyl, aryl, aralkyl or alkaryl hydrocarbon radical.

BACKGROUND OF THE INVENTION

(1) Field of the invention

This invention is directed to a novel composition of matter and to a method for its preparation. More particularly, the invention relates to trisubstituted isocyanurate monomers and polymers thereof. Still more particularly, it relates to tris (allylcarbonyl dioxy alkyl) isocyanurates.

The polymers derived from the monomeric compositions of this invention are used in applications where excellent surface hardness and scratch resistance are important. Such properties make the polymers of this invention useful in castings, coatings, and molding resins. In particular, these compositions can be molded into dinnerware, i.e., flatware including cups, saucers, plates and the like and into laminated table, bar and counter tops.

(2) Description of the prior art

The compositions of this invention are derivatives of cyanuric acid and more particularly, are derivatives of tris (2-hydroyalkyl) isocyanurates, the preparation of which is described in U.S. Pat. 3,088,948. It is known to polymerize these isocyanurates, e.g., tris (2-hydroxyethyl) isocyanurate, for use in molding resins; see U.S. Pat. 3,293,244. U.S. Pat. 2,403,112 describes the method of preparing molding compositions from allyl carbonates such as ethylene glycol bis (allyl carbonate) and diethylene glycol bis (methallyl carbonate). These compounds have been reported to be useful in molding compounds because of their surface hardness and scratch resistance. Melamine-formaldehyde resins are recognized as standards for use in molded articles. There is a great deal of interest in the molding industry for new intermediates and polymers thereof which have the physical properties possessed by these types of compounds.

SUMMARY OF THE INVENTION

Polymers derived from the trisbustituted isocyanurate monomers of this invention have been found to have excellent surface hardness and scratch resistance when compared to compositions such as the prior art resins comprising allyl carbonates and melamine-formaldehyde.

An object of the present invention is to provide a new composition of matter. Another object of this invention is to provide monomers and polymers thereof for use in castings and for producing thermosetting molding resins useful in dinnerware and laminated table tops.

The present invention provides a trisubstituted isocyanurate composition represented by the formula:

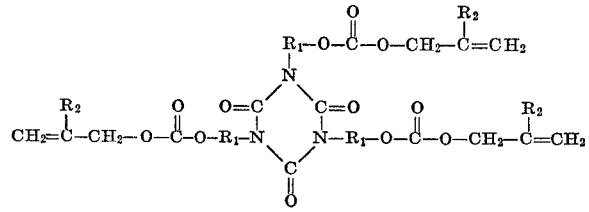

wherein $R_1$ is a lower alkyl and $R_2$ is hydrogen or an alkyl, aryl, aralkyl or alkaryl hydrocarbon radical.

The compositions of this invention are prepared by reacting (1) a tris (hydroxyalkyl) isocyanurate having the formula:

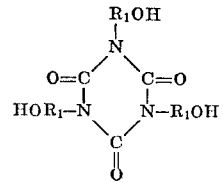

wherein $R_1$ is a lower alkyl and (2) allyl haloformate or a substituted haloformate having the formula:

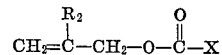

wherein $R_2$ is H or an alkyl, aryl, aralkyl or alkaryl hydrocarbon radical and X is chloro, bromo, or iodo. The reaction is carried out in the presence of an acid acceptor at a temperature in the range of about $-5°$ to about $100°$ C. and a pressure of atmospheric up to 100 p.s.i.g. for a period of ½ hour to several hours.

The reaction is illustrated by the following equations:

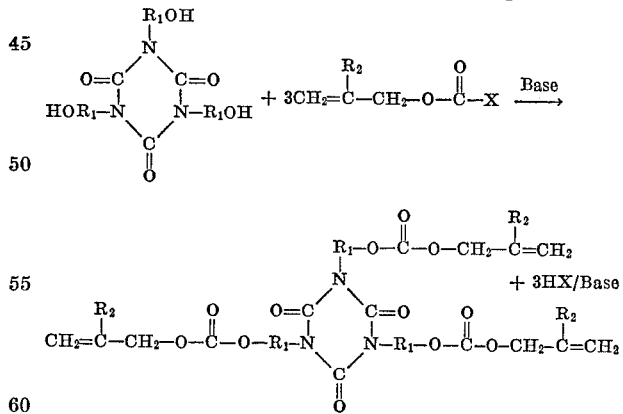

As indicated by the above equation, the reactants are generally mixed in the stoichiometrical proportion of 3 moles of the allyl haloformate to 1 mole of the isocyanurate compound. However, the reaction can be suitably carried out using about 2 to 5 moles of the haloformates to 1 mole of the isocyanurates.

PREFERRED EMBODIMENTS OF THIS INVENTION

In the preferred composition of this invention, $R_1$ is a $C_2$ alkyl and $R_2$ is H resulting in a structure designated as a tris (allyl carbonyldioxyethyl) isocyanurate and is also designated as 1,3,5-tris (allyl carbonyldioxyethyl)-2,4,6-trioxohexahydro-s-triazine:

of water and the oily product phase is extracted and purified with ether leaving the desired tris (allyl carbonyldi-

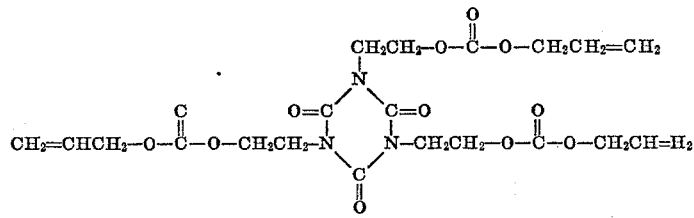

One method for preparing this preferred composition comprises reacting tris (2-hydroxyethyl) isocyanurate with allyl chloroformate, in the mole ratio of 3 moles of the chloroformate to 1 mole of the isocyanurate. The reaction is carried out in the presence of a base such as pyridine at a temperature of about −5° to 25° C. and atmospheric pressure for a period of 6 to 24 hours. The reaction mixture is then separated into solid and liquid phases. The liquid phase is washed with an excess amount oxyethyl) isocyanurate in the form of a white, wax-like solid.

In other compositions contemplated by this invention, $R_1$ is an alkyl having 1 to 4 carbon atoms and $R_2$ is H or an alkyl having 1 to 8 carbon atoms or an aryl, aralkyl or an alkaryl having up to 16 carbon atoms. Specific examples of these other compositions are illustrated below:

tris (methallyl carbonyldioxyethyl) isocyanurate:
tris (methallyl carbonyldioxyethyl) isocyanurate:

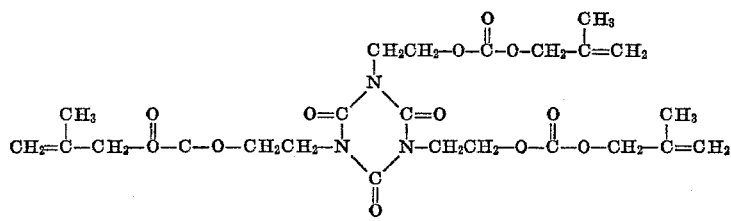

tris (octallyl carbonyldioxyethyl) isocyanurate:

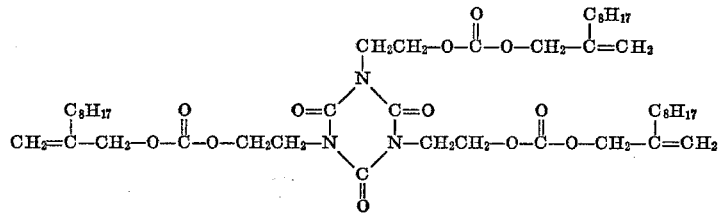

tris (phenallyl carbonyldioxyethyl) isocyanurate:

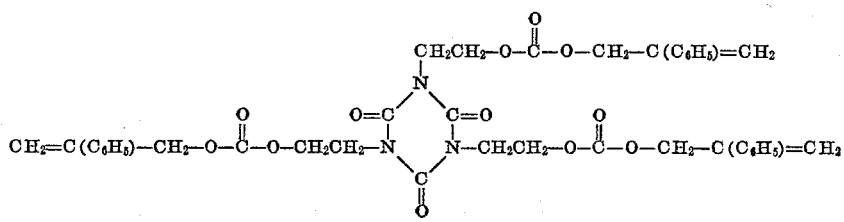

tris (p-methylphenallyl carbonyldioxyethyl) isocyanurate:

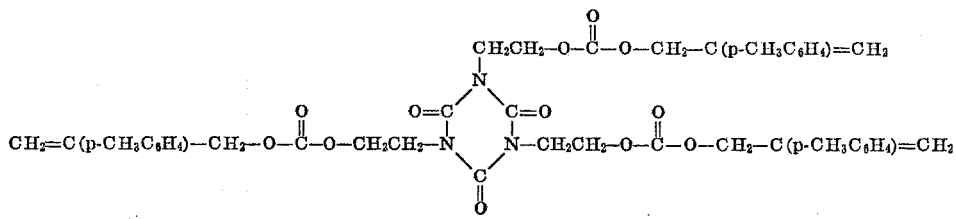

tris (allyl carbonyldioxymethyl) isocyanurate:

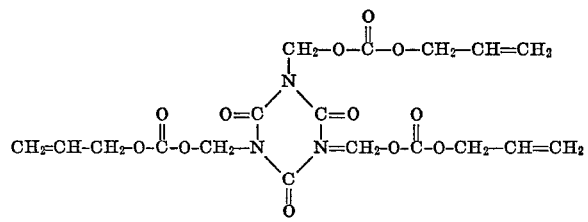

Homopolymers and copolymers derived from the trisubstituted isocyanurate compositions are also provided in accordance with this invention. The tris allyl(carbonyldioxyalkyl) isocyanurate monomers of this invention polymerize in the presence of a free-radical initiator to form a cross-linked, thermosetting resin which has excellent hardness and scratch resistance as indicated in the example below. Typical comonomers that can be copolymerized with the isocyanurate monomers of this invention include other cyanuric acid derivatives, vinyl aromatics diallyl carbonates, diallyl phthalates, unsaturated polyesters, and derivates thereof and the like. Examples of free-radical initiators include di-tertiary butyl perbenzoate, azobisisobutyronitrile, di-tertiary butyl peroxide, dibenzoyl peroxide, dilauroyl peroxide, cyclohexanone, tertiarybutyl hydroperoxide, di-acetyl peroxide, dibenzoyl peroxide, cumene hydroperoxide, dicumyl peroxide and the like.

The examples below illustrate the method of preparation of the compositions of the present invention and their subsequent polymerization to useful materials.

EXAMPLE 1

This example illustrates the preparation of the tris (allyl carbonyldioxyethyl) isocyanurate in which 174.2 grams (0.67 mole) of tris (2-hydroxyethyl) isocyanurate (THEIC) were charged to an agitated vessel followed by 390 grams (4.9 moles) of pyridine. About 265 grams (2.2 moles) of allyl chloroformate was continuously added over a period of 3 hours and 10 minutes and the mixture was allowed to react with moderate agitation for a period of about 12 hours in the range of about 5° to 10° C. The reaction mixture was then separated into a solid and liquid phase. About 500 ml. of water were added and the mixture was separated into two liquid phases. The lower oily phase was extracted with anhydrous ether and the resulting white, wax-like solid was collected.

A nuclear magnetic resonance spectrum of a sample of the monomer was found to be in agreement with the structure

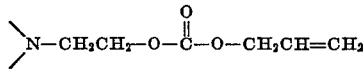

The infrared spectrum of a sample of this resin showed a strong carbonyl bond at 1750 cm.$^{-1}$ which is representative of the posiiton for carbonates and another strong carbonyl bond at 1690 cm.$^{-1}$ which together with the nuclear magnetic resonance spectrum indicates that the sample is a cyclic amide type of carbonyl. The overall conclusion based on knowledge of the starting materials, the type of reactions that take place and the nuclear magnetic resonance and infrared data establish the composition of this example has the structure set forth above in the preferred embodiment of this invention.

EXAMPLE 2

This example illustrates the process for polymerizing the monomer of Example 1. A monomeric solution comprising 50 grams of the tris (allyl carbonyldioxyethyl) isocyanurate and 1.5 grams of t-butyl perbenzoate as the initiator was placed between two plates of glass separated by a flexible gasket. The glass plates were held together by means of clamps to prevent the monomeric solution from escaping from the mold. The filled mold was then placed in a water bath and heated at a closely controlled temperature of 70° C. for 27 hours. The clamps, the top glass plate and the gasket were removed and the resulting resin was pried from the bottom glass plate to yield a cast resin sheet. This sheet was then placed between two inner layers of flannel and outer glass plates and post-cured at a temperature of 115° C. for two hours to achieve maximum hardness and stability for the resin. The post-cured resin was analyzed for hardness using a Barcol Impressor. The Barcol Impressor is a hand held instrument which ultilizes a spring loaded indenter. The instrument is calibrated against a standard metal alloy for surface hardness. The valves obtained are relative numbers. The resin was also analyzed for scratch resistance by the Taber Scratch Resistance Test in which the sample was placed on a turntable, a weighted chisel point was applied to the surface of the sample and the width of the scratch made on the sample was measured. The resin of this example had a Barcol hardness of 55 and a Taber scratch width of 0.4 mm. with a 150 gram weight.

EXAMPLE 3 (Controls)

The same polymerization method described under Example 2 for obtaining cast resin sheets was applied to a monomeric solution comprising 100 grams of diethylene glycol bis (allyl carbonate) which is sold under the trade name CR–39 and 3.3 grams of benzoyl peroxide. A sample of the resulting cast resins sheet was found to have a Taber scratch width of 0.5 mm. with a 150 gram weight and a Barcol hardness of 31.

A standard grade of melamine-formaldehyde resin was found to have a Taber width of scratch of about 0.2 mm. with the same weight and a Barcol hardness of 60.

The foregoing data illustrates the excellent hardness and scratch resistance of the polymeric compositions of this invention when compared to known molding compositions.

EXAMPLE 4

The method of Example 1 is carried out by reacting with the THEIC an equivalent weight of methallyl chloroformate in place of the allyl chloroformate to produce tris (methallyl carbonyldioxyethyl) isocyanurate.

EXAMPLE 5

The method of Example 1 is repeated by using an equivalent weight of octallyl chloroformate in place of the allyl chloroformate to produce tris (octallyl carbonyldioxyethyl) isocyanurate.

EXAMPLE 6

The method of Example 1 is also employed by reacting an equivalent weight of either phenallyl chloroformate or p-methylphenallyl chloroformate with the THEIC to produce tris (phenallyl carbonyldioxyethyl) and tris (p-methylphenallyl carbonyldioxyethyl) isocyanurate, respectively.

EXAMPLE 7

The method of Example 1 is also repeated by employing an equivalent weight of tris (2-hydroxymethyl) isocyanurate in place of the THEIC to produce tris (allyl carbonyldioxymethyl) isocyanurate.

The foregoing examples are intended to be illustrative of the types of compositions contemplated by this invention, but are not intended to be limiting. For instance, pyridine is the only acid acceptor employed in the examples for the synthesis of the compositions of this invention. However, it is apparent that other organic bases can be used such as collidine and dimethyl aniline as well as quaternary bases, e.g., trimethyl phenyl ammonium hydroxide and inorganic bases, e.g., sodium hydroxide. The

What is claimed is:
1. A trisubstituted isocyanurate compound represented by the formula:

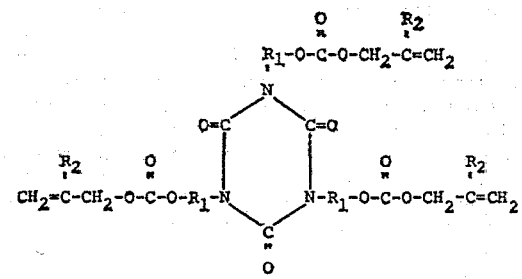

wherein $R_1$ is an alkyl having 1 to 4 carbon atoms and $R_2$ is H, an alkyl having 1 to 8 carbon atoms, phenyl or an alkyl-substituted phenyl having up to 16 carbon atoms.

2. A compound of claim 1 wherein $R_1$ is a $C_2$ alkyl and $R_2$ is H.

References Cited
UNITED STATES PATENTS

| | | | |
|---|---|---|---|
| 2,275,467 | 3/1942 | Pollack et al. | 260—248 X |
| 3,165,514 | 1/1965 | D'Alelio | 260—248 |
| 3,249,607 | 5/1966 | Taub et al. | 260—248 |

JOHN M. FORD, Primary Examiner

U.S. Cl. X.R.

260—88.3 R, 77.5 NC, 77.5 CR